UNITED STATES PATENT OFFICE.

OTTO STAEHLIN, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

MORDANT AZO DYESTUFFS.

1,155,765. Specification of Letters Patent. Patented Oct. 5, 1915.

No Drawing. Application filed October 1, 1913. Serial No. 792,790.

*To all whom it may concern:*

Be it known that I, OTTO STAEHLIN, Ph. D., chemist, a citizen of the Empire of Germany, residing at Höchst-on-the-Main, Germany, have invented certain new and useful Improvements in New Mordant Azo Dyestuffs, of which the following is a specification.

My invention relates to the manufacture of new mordant dyestuffs which on addition of a potassium bichromate can be dyed in a single bath dyeing wool green tints.

The method of preparing said dyestuffs consists in combining the diazotized picramic acid (2-amino-4.6-dinitrophenol) with a monoalkyl-ether of the 1.8-dioxynaphthalene-4-sulfonic acid.

The new dyestuffs have most probably the formula:

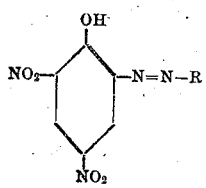

wherein R represents the aryl radical of a monoalkyl ether of 1.8-dioxynaphthalene-4-sulfonic acid. In other words, they may probably be represented by the formula:

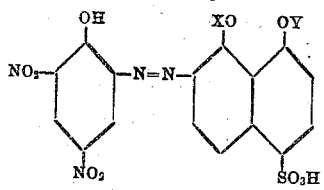

wherein X stands for hydrogen and Y for an alkyl group such as $CH_3$, $C_2H_5$, or inversely. In the form of their sodium salts, they are greenish-black powders soluble in water with a violet-blue color which on addition of a mineral acid become cherry-red; they dissolve in concentrated sulfuric acid with a bluish-green color and dye unmordanted wool, on addition of potassium bichromate and an acid, uniform Russian green tints of excellent fastness to milling and to light.

The following example will serve to illustrate my invention: 22.1 kilos of sodium picramate are diazotized in the usual manner with 6.9 kilos of nitrite and 40 kilos of hydrochloric acid. The diazo solution thus obtained is introduced, while well stirring, at 15-20° C., into a solution of 30 kilos of the sodium salt of 1-ethoxy-8-oxynaphthalene-4-sulfonic acid after having added to this solution 30 kilos of sodium carbonate. The union occurs readily without decomposition. The sodium salt of the dyestuff which most probably has the formula:—

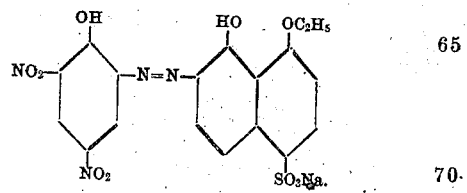

completely separates within a few hours, whereupon it is filtered and dried. It forms a greenish-black powder, readily soluble in water with a violet-blue color which becomes cherry-red on addition of an acid; in concentrated sulfuric acid it dissolves with a bluish-green color.

Having now described my invention, what I claim is:

1. As new articles of manufacture, the mordant dyestuffs having most probably the formula:—

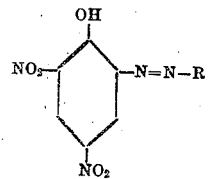

wherein R represents the aryl radical of a monoalkyl ether of 4-sulfo-1.8-dioxynaphthalene, which in the form of their sodium salts, are greenish-black powders, soluble in water with a violet-blue color turning cherry red on addition of a mineral acid, and dissolve in concentrated sulfuric acid with a bluish-green color, dyeing wool on addition of potassium bichromate and an acid uniform Russian-green tints fast to milling, and being remarkable for their excellent fastness to light.

2. As a new article of manufacture, the mordant dyestuff having most probably the formula:

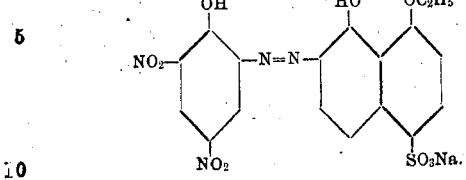

which is a greenish-black powder, soluble in water with a violet-blue color turning cherry-red on addition of a mineral acid, and dissolves in concentrated sulfuric acid with a bluish-green color, dyeing wool on addition of potassium bichromate and an acid uniform Russian-green tints fast to milling and remarkable for their excellent fastness to light.

In testimony whereof I affix my signature in presence of two witnesses.

DR. OTTO STAEHLIN.

Witnesses:
 JEAN GRUND,
 CARL GRUND.